(12) United States Patent
Kimura

(10) Patent No.: US 10,309,827 B2
(45) Date of Patent: Jun. 4, 2019

(54) MULTI-OPTICAL AXIS PHOTOELECTRIC SENSOR COMPRISING A LIGHT TRANSMISSIVE PLATE DISPOSED TO STRADDLE THE BODY HOUSING AND A PAIR OF CAPS

(71) Applicant: PANASONIC INDUSTRIAL DEVICES SUNX CO., LTD., Aichi (JP)

(72) Inventor: Keisuke Kimura, Aichi (JP)

(73) Assignee: PANASONIC INDUSTRIAL DEVICES SUNX CO., LTD., Aichi (JP)

( * ) Notice: Subject to any disclaimer, the term of this patent is extended or adjusted under 35 U.S.C. 154(b) by 118 days.

(21) Appl. No.: 15/560,556

(22) PCT Filed: Jan. 18, 2016

(86) PCT No.: PCT/JP2016/051242
§ 371 (c)(1),
(2) Date: Sep. 22, 2017

(87) PCT Pub. No.: WO2016/157940
PCT Pub. Date: Oct. 6, 2016

(65) Prior Publication Data
US 2018/0052043 A1 Feb. 22, 2018

(30) Foreign Application Priority Data
Mar. 31, 2015 (JP) ................ 2015-073807

(51) Int. Cl.
*G01J 1/02* (2006.01)
*H01H 35/00* (2006.01)
*G01V 8/20* (2006.01)

(52) U.S. Cl.
CPC .......... *G01J 1/0271* (2013.01); *G01V 8/20* (2013.01); *H01H 35/00* (2013.01)

(58) Field of Classification Search
CPC .... G01J 1/0214; G01J 1/06; G01J 1/42; G01J 1/0271; G01V 8/20; H01L 31/0203
(Continued)

(56) References Cited

U.S. PATENT DOCUMENTS

| 5,481,297 A | 1/1996 | Cash et al. |
| 8,115,185 B2 * | 2/2012 | Engstrand ................ G01J 1/02 250/205 |

(Continued)

FOREIGN PATENT DOCUMENTS

| CN | 1755856 A | 4/2006 |
| EP | 2 461 340 A1 | 6/2012 |

(Continued)

OTHER PUBLICATIONS

International Search Report issued in PCT/JP2016/051242; dated Mar. 8, 2016.
(Continued)

*Primary Examiner* — Que Tan Le
(74) *Attorney, Agent, or Firm* — Studebaker & Brackett PC

(57) ABSTRACT

A multi-optical axis photoelectric sensor includes: a pair of body-side packings which seal between a body housing and both side edges of a light transmissive plate; first packings which seal between caps and the side edges of the light transmissive plate, and between the caps and end portions of the light transmissive plate, and which are connected to the pair of body-side packings; and second packings which are integrally molded with the first packings, respectively, and which seal between the caps and the body housing.

6 Claims, 12 Drawing Sheets

(58) Field of Classification Search
USPC .................................................. 250/239, 551
See application file for complete search history.

(56) References Cited

U.S. PATENT DOCUMENTS

| | | |
|---|---|---|
| 2002/0017604 A1 | 2/2002 | Nakazaki et al. |
| 2006/0065818 A1 | 3/2006 | Shimokawa et al. |
| 2009/0001298 A1 | 1/2009 | Deguchi |
| 2012/0018443 A1 | 1/2012 | Bochud et al. |
| 2012/0112049 A1 | 5/2012 | Shimokawa et al. |

FOREIGN PATENT DOCUMENTS

| | | | |
|---|---|---|---|
| JP | 2001155597 A | 6/2001 | |
| JP | 2001251595 A | 9/2001 | |
| JP | 2002-124170 A | 4/2002 | |
| JP | 2009010817 A | 1/2009 | |
| JP | 2009-272064 A | 11/2009 | |
| JP | 5141825 B2 | 2/2013 | |
| WO | 2011/013643 A1 | 2/2011 | |
| WO | 2011013643 A1 | 2/2011 | |
| WO | 2014/103444 A1 | 7/2014 | |

OTHER PUBLICATIONS

Written Opinion issued in PCT/JP2016/051242; dated Mar. 8, 2016.
The extended European search report issued by the European Patent Office dated Oct. 24, 2018, which corresponds to EP16771826.1-1003 and is related to U.S. Appl. No. 15/560,556.
An Office Action mailed by the China National Intellectual Property Administration dated Sep. 3, 2018, which corresponds to Chinese Patent Application No. 201680020909.0 and is related to U.S. Appl. No. 15/560,556.

\* cited by examiner

MULTI-OPTICAL AXIS PHOTOELECTRIC SENSOR COMPRISING A LIGHT TRANSMISSIVE PLATE DISPOSED TO STRADDLE THE BODY HOUSING AND A PAIR OF CAPS

TECHNICAL FIELD

The present invention relates to a multi-optical axis photoelectric sensor having a plurality of photoelectric elements.

BACKGROUND ART

Conventionally, multi-optical axis photoelectric sensors in which photoelectric elements for forming an optical axis are arranged in one row in an elongated casing are well known (for example, see Patent Literature 1). Here, a multi-optical axis photoelectric sensor in which the photoelectric elements are light emitting elements functions as a light emitter, and a multi-optical axis photoelectric sensor in which the photoelectric elements are light receiving elements functions as a light receiver.

A casing of the multi-optical axis photoelectric sensor of Patent Literature 1 has a frame body in which the front and both end surfaces are opened, and caps which close the both end surfaces of the frame body. Then, a light transmissive plate through which light is transmissible is disposed on the front opening of the frame body to close the opening. Moreover, the multi-optical axis photoelectric sensor may be possibly used in a situation where dust and liquid fly, and therefore a sealing portion (elastic member) is interposed in order to seal a gap between the frame body and the light transmissive plate. More specifically, the string-shaped sealing portion is placed in an annular state so as to straddle a support which is formed along a side edge portion of the opening of the frame body, and a communication portion of the cap which is formed so as to communicate with the support. In the case where the string-shaped sealing portion is formed into an annular shape, end portions are adhered together by, for example, an adhesive agent, or, in a state where the end portions are overlapped with each other, the support and the light transmissive plate, or the communication portion and the light transmissive plate are press-bonded to each other, whereby sealing is performed. In order to seal a gap between the frame body and the cap, moreover, a sealing portion (packing) is interposed.

PRIOR ART DOCUMENT

Patent Literature

Patent Literature 1: JP-B2-5141825

SUMMARY OF INVENTION

Technical Problem

In the above-described multi-optical axis photoelectric sensor, various sealing portions are interposed between the frame body and the cap, the light transmissive plate and the cap, and the light transmissive plate and the frame body. Here, it is contemplated that, in order to seal between the sealing portion which seals the gap between the frame body and the cap, and that which is annularly placed so as to straddle the cap and the frame body, the sealing portions are adhered or press-bonded together. In the case where the sealing portion between the cap and the frame body is to be connected to the sealing portion which is annularly placed so as to straddle the cap and the frame body, however, the connection must be made at four places in total. Specifically, the sealing portion between the cap and the frame body is connected to two places of a portion straddling the cap in one end portion of the frame body, and the sealing portion between the cap and the frame body is connected to two places of the portion straddling the cap at two places in the other end portion of the frame body. In the sealing portion which is annularly placed so as to straddle the cap and the frame body, moreover, the end portions of the sealing portion which is originally in a string-like shape are connected to each other. In the conventional multi-optical axis photoelectric sensor, namely, the connection must be made at five places in total when sealing is to be performed between the sealing portion which seals the gap between the frame body and the cap, and that which is annularly placed so as to straddle the cap and the frame body.

The invention has been conducted in order to solve the above problem. It is an object of the invention to provide a multi-optical axis photoelectric sensor in which the number of places where sealing portions are connected to each other can be reduced.

Solution to Problem

A multi-optical axis photoelectric sensor which solves the problem includes: a body housing which has openings in a front surface and both end portions, respectively; a pair of caps which close the openings of the both end portions of the body housing, respectively; and a light transmissive plate which closes the opening of the front surface of the body housing, and through which light of photoelectric elements is transmissible, the light transmissive plate is disposed to straddle the body housing and the pair of caps, and the sensor has: a pair of first sealing portions which seal between the body housing and both side edges of the light transmissive plate; second sealing portions which seal between the caps and the side edges of the light transmissive plate, and between the caps and end portions of the light transmissive plate, and which are connected to the pair of first sealing portions; and third sealing portions which are integrally molded with the second sealing portions, respectively, and which seal between the caps and the body housing.

According to the configuration, the second sealing portions and the third sealing portions are integrally molded with each other, and therefore the second sealing portions and the third sealing portions are not required to be connected to each other by adhesion or press-bonding. That is, connecting portions in the sealing portion are formed only between the pair of first sealing portions and the second sealing portions. In the case where the second sealing portions are connected to the both end portions of the pair of first sealing portions, respectively, namely, the connection is made at four places, and therefore the number of connecting portions can be reduced.

In the above multi-optical axis photoelectric sensor, preferably, each of the second sealing portions has: a pair of side portions which correspond between the both side edges of the light transmissive plate and the cap; an end-portion continuous portion which makes the side portions continuous in one end portions of the side portions, and which corresponds between a side of the end portion of the light transmissive plate and the cap; and a beam portion which connects the side portions to each other at a position that is separated from the end-portion continuous portion.

According to the configuration, the disposition of the beam portion which connects the side portions of the second sealing portion can prevent the side portions from inwardly falling down.

In the above multi-optical axis photoelectric sensor, preferably, each of the second sealing portions has: a pair of side portions which correspond between the both side edges of the light transmissive plate and the cap; a pair of connecting portions which are connected to the pair of first sealing portions; and, between the side portions and the connecting portions, crank portions which cause the connecting portions to be outwardly separated with respect to the pair of side portions.

According to the configuration, the second sealing portion has the crank portions which cause the connecting portions to be outwardly separated with respect to the pair of side portions, between the side portions and the connecting portions, and therefore the connecting portions can be outwardly separated by the crank portions, so that the first sealing portions can be placed inner than the connecting portions. In the configuration, a work of setting the sealing portions in the body housing is easily performed. Moreover, for example, the side portions of the second sealing portion, and the first sealing portion can be placed substantially in a same straight line, and therefore it is possible to prevent the first sealing portion which is placed in the inner side, from being placed on the optical axes of the photoelectric elements.

In the above multi-optical axis photoelectric sensor, preferably, the first sealing portions, the second sealing portions, and the third sealing portions are formed to have a polygonal shape having a plurality of planes.

According to the configuration, the first sealing portions, the second sealing portions, and the third sealing portions are formed to have a polygonal shape having a plurality of planes. When butting of the sealing portions is to be performed, therefore, the butting through the planes is performed. Consequently, the contact area can be widened as compared with a point contact. As a result, the sealing property can be enhanced.

In the above multi-optical axis photoelectric sensor, preferably, each of the first sealing portions has: a first butting surface which, when the first sealing portion is to be clamped between the light transmissive plate and the body housing, butts against the light transmissive plate, and which has a planer shape; and a second butting surface which butts against the body housing, and the second butting surface is formed to have a shape which is wider than the first butting surface.

According to the configuration, each of the first sealing portions is formed so that the second butting surface has a shape which is wider than the first butting surface. When, in an assembling process, a force is applied to (compresses) the first sealing portion from the front surface side (the side of the light transmissive plate), therefore, the first sealing portion can be stably held to the body housing because the second butting surface has the wider shape. Also in the case where, in the compression of the first sealing portion, a force acts in a twisting direction on the side of the first butting surface of the first sealing portion, the second butting surface is stabilized, and therefore it is possible to prevent the first sealing portion from being twisted.

In the above multi-optical axis photoelectric sensor, preferably, connecting surfaces between the first sealing portions and the second sealing portions are tapered surfaces.

According to the configuration, the connecting surfaces between the first sealing portions and the second sealing portions are tapered surfaces, and therefore the connection can be made while forming the connecting surfaces between the first sealing portions and the second sealing portions as tapered surfaces (inclined surfaces). Consequently, a gap is hardly formed between the first sealing portions and the second sealing portions, and the waterproofing property can be enhanced.

Advantageous Effects of Invention

According to the multi-optical axis photoelectric sensor of the invention, the number of places where sealing portions are connected to each other can be reduced.

DESCRIPTION OF EMBODIMENTS

Hereinafter, an embodiment of a multi-optical axis photoelectric sensor will be described with reference to the drawings.

Figure 1:
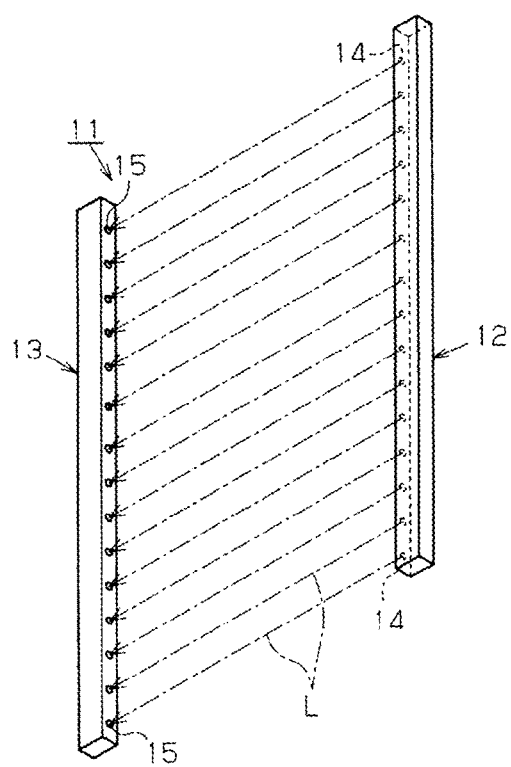
FIG. 1 is a perspective view diagrammatically showing a light curtain in an embodiment.

As shown in FIG. 1, a light curtain 11 has a light projector 12 which is an example of the multi-optical axis photoelectric sensor, and a light receiver 13 which is paired with the light projector 12, and which is similarly an example of the multi-optical axis photoelectric sensor. In the light projector 12, a plurality of light projecting elements 14 are arranged in one row. In the light receiver 13, by contrast, a plurality of light receiving elements 15 are arranged in one row. The light projector 12 and the light receiver 13 are placed at positions which are opposed to each other across a predetermined detection region so that the light projecting elements 14 and the light receiving elements 15 are paired with each other to form optical axes L. Then, the light projector 12 and the light receiver 13 perform light projecting and receiving operations on the respective optical axes L between the light projecting elements 14 and light receiving elements which are paired with each other, thereby detecting existence/nonexistence of an object in the detection region.

The light projector 12 and the light receiver 13 have a substantially identical basic structure except differences of partial configurations such as that the photoelectric elements are light projecting elements or light receiving elements. In the following description, therefore, the light receiver 13 will be exemplarily described as an example of the multi-optical axis photoelectric sensor.

Figure 2:
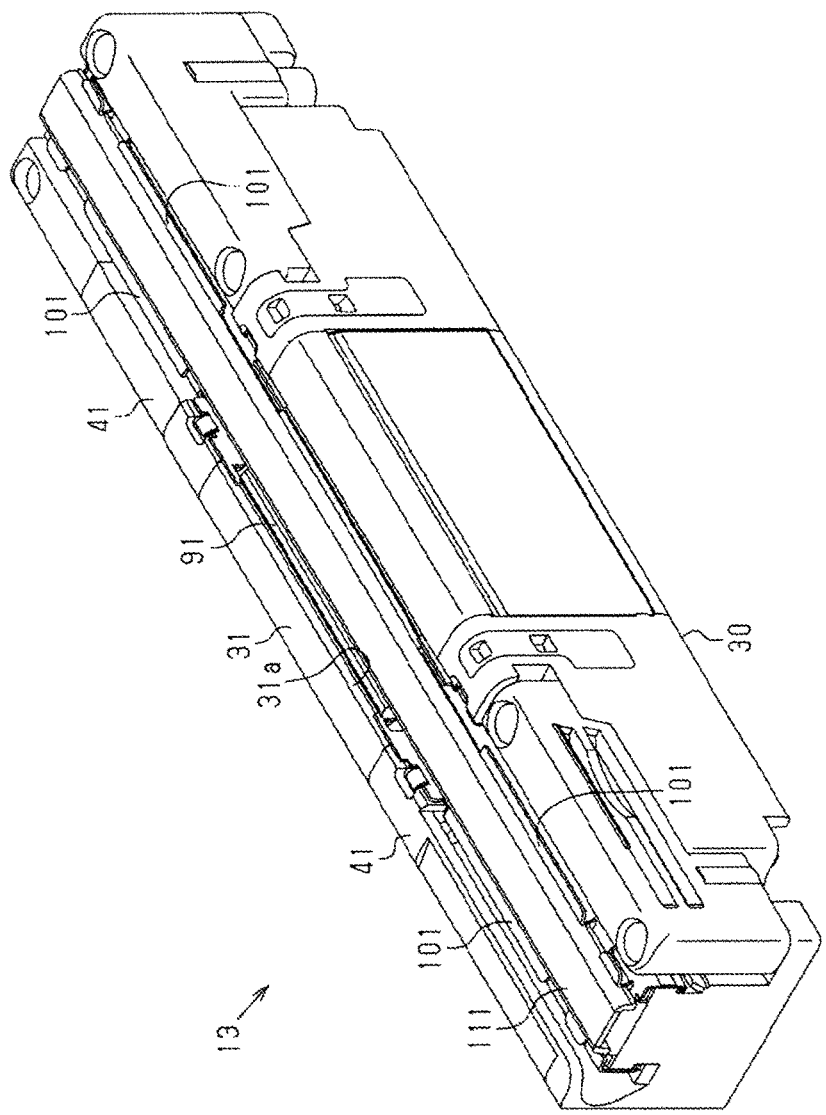
FIG. 2 is a perspective view of a light receiver in the embodiment.
Figure 2:
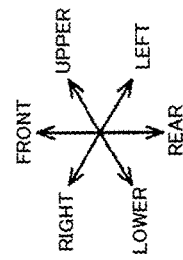
Figure 3:
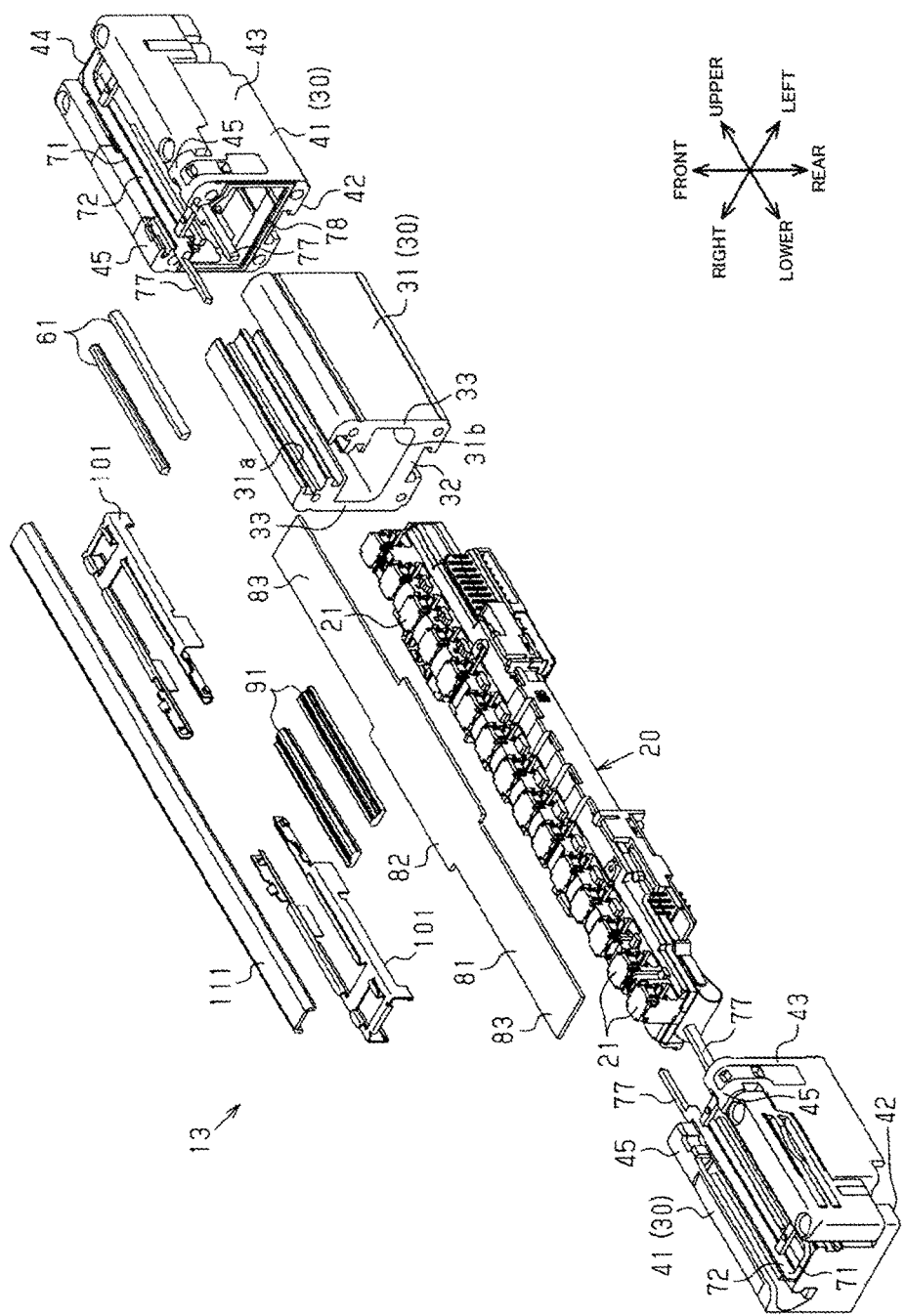
FIG. 3 is an exploded perspective view of the light receiver in the embodiment.

As shown in FIGS. 2 and 3, the light receiver 13 has an elongated element block 20, an elongated case 30 which covers from the outside the element block 20, and a light transmissive plate 81 which is disposed so as to correspond to the light receiving elements 15 (see FIG. 1). In the following, description will be made with the assumption that the direction of the optical axes L (the direction extending along the optical axes L) is the anteroposterior direction, the longitudinal direction of the element block 20 and the case 30 is the vertical direction, and the direction perpendicular to the anteroposterior and vertical directions is the lateral direction.

As shown in FIG. 3, the element block 20 has the plurality of light receiving elements 15 (see FIG. 1) which function as the photoelectric elements, and a plurality (in FIG. 3, fifteen) of lenses 21 which are disposed so as to correspond to the front surfaces of the light receiving elements 15, respectively. The element block 20 has a control circuit board (not shown) and the like in addition to the above-described components.

As shown in FIGS. 2 and 3, the case 30 has a body housing 31 in which the front surface and the upper and lower ends are opened, and a pair of caps 41 which close openings 31b of the both lateral ends of the body housing 31.

<Body Housing 31>

Figure 6:
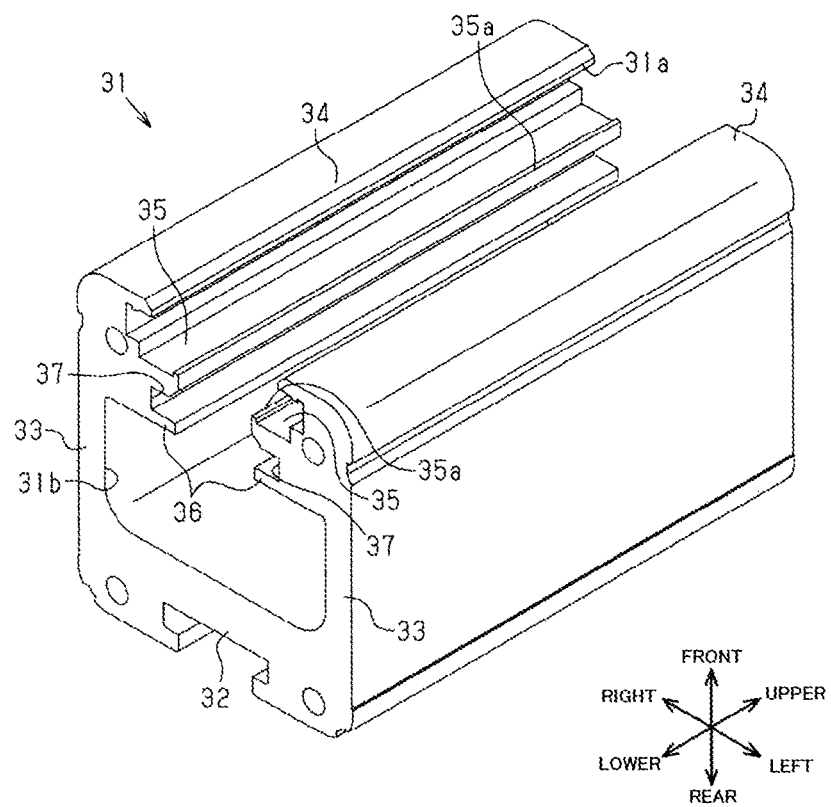
FIG. 6 is a perspective view of a body housing in the embodiment.

As shown in FIGS. 3 and 6, the body housing 31 has a rear plate 32, and a pair of side plates 33 which forwardly extend from the lateral sides of the rear plate 32, respectively. Each of the side plates 33 has a first extending portion 34 which extends from the inner surface toward the lateral inner side (the central side), at the front end of the side plate. The gap between the first extending portions 34 is an opening 31a in the front surface of the body housing 31.

As shown in FIG. 6, each of the side plates 33 further has a second extending portion 35 which extends from the inner surface toward the lateral inner side (the central side), on the rear side with respect to the first extending portion 34. Projections 35a which forwardly project are formed at tip end portions of the second extending portions 35, respectively. The tip end portions of the second extending portions 35 are formed so as to be located laterally inside the tip end portion of the first extending portion 34. Therefore, the gap between the second extending portions 35 is narrower than the opening 31a.

As shown in FIG. 6, each of the side plates 33 further has a third extending portion 36 which extends from the inner surface toward the lateral inner side (the central side), on the rear side with respect to the second extending portion 35. Therefore, a groove 37 which is elongated in the longitudinal direction (the vertical direction) of the body housing 31 is formed between the second extending portion 35 and the third extending portion 36.

<Caps 41>

Figure 7:
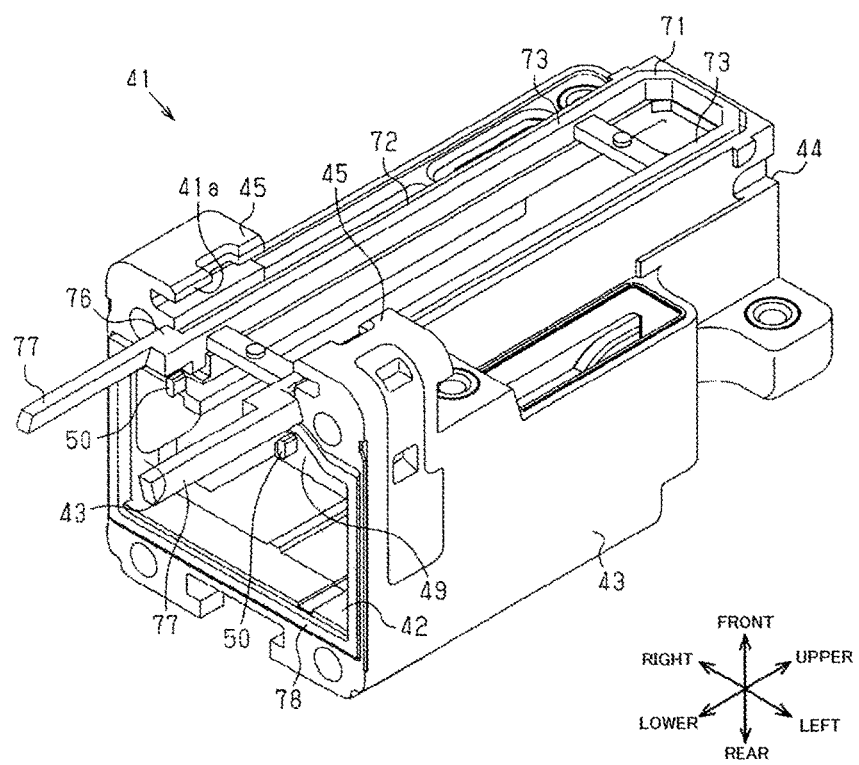
FIG. 7 is a perspective view showing main portions of a cap in the embodiment.
Figure 8:
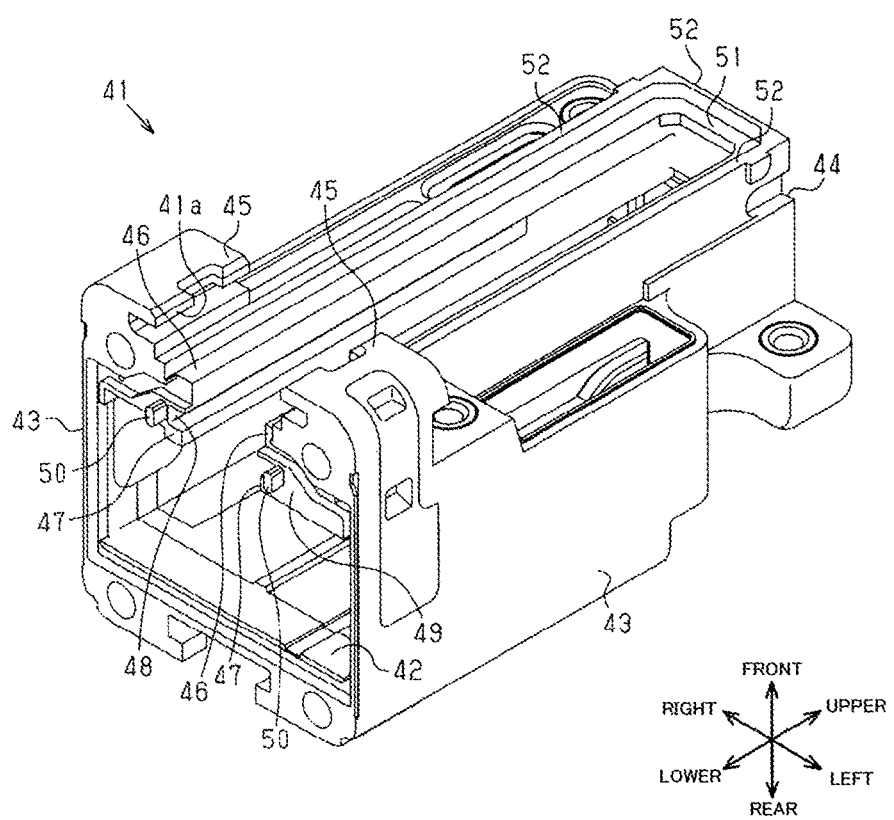
FIG. 8 is a perspective view showing the main portions of the cap in the embodiment in a state where a cap-side packing is removed away.

As shown in FIGS. 3, 7, and 8, each of the caps 41 has a rear plate 42, a pair of side plates 43 which forwardly extend from the lateral sides of the rear plate 42, respectively, and an endplate 44 which forwardly extends from one vertical side of the rear plate 42, and which connects together the side plates 43.

As shown in FIGS. 7 and 8, each of the side plates 43 has a first extending portion 45 which extends from the inner surface toward the lateral inner side (the central side), at the front end of the side plate. The first extending portions 45 are formed only on the side of the body housing 31 (see FIG. 3) in the vertical direction. The gap between the first extending portions 45 corresponds to an opening 41a in the front surface of the cap 41. FIGS. 7 and 8 show a state where molded members and the like for partly covering cables and the like to be connected to an indicator, the control circuit board, etc. are detached. In a state where these molded members and the like are attached (see FIGS. 2 to 5), the opening 41a of the cap 41 is formed in the vertical direction.

As shown in FIG. 8, each of the side plates 43 has a second extending portion 46 which extends from the inner surface toward the lateral inner side (the central side), on the rear side with respect to the first extending portion 45. A tip end portion of the second extending portion 46 is formed so as to be located laterally inside the tip end portion of the first extending portion 45. Therefore, the gap between the second extending portions 46 is narrower than the opening 41a.

As shown in FIG. 8, each of the side plates 43 has a third extending portion 47 which extends from the inner surface toward the lateral inner side (the central side), on the rear side with respect to the second extending portion 46. Therefore, a groove 48 which is elongated in the longitudinal direction (the vertical direction) of the cap 41 is formed between the second extending portion 46 and the third extending portion 47.

In each of the caps 41, as shown in FIGS. 7 and 8, two positioning projections 50 which are to be inserted into the grooves 37 of the body housing 31 are formed laterally outside the groove 48, and on a surface 49 opposed to the body housing 31. The positioning projections 50 are to be fitted into the grooves 37 of the body housing 31. When the cap 41 is to be attached to the body housing 31, namely, the cap 41 is positioned with respect to the body housing 31 by fitting the positioning projections 50 into the grooves 37 of the body housing 31.

As shown in FIG. 8, moreover, the second extending portions 46 of the cap 41 are made continuous with each other by a fourth extending portion 51 which extends toward the body housing 31 from the side of the end plate 44 that is in the longitudinal direction (the vertical direction) of the cap 41, and on the side opposite to the body housing 31. Projections 52 which project in the direction (the forward direction) perpendicular to the extending directions of the second and fourth extending portions 46, 51 are formed on outer edge portions of the second extending portions 46 and the fourth extending portion 51.

<Packings 61, 71>

Figure 4:
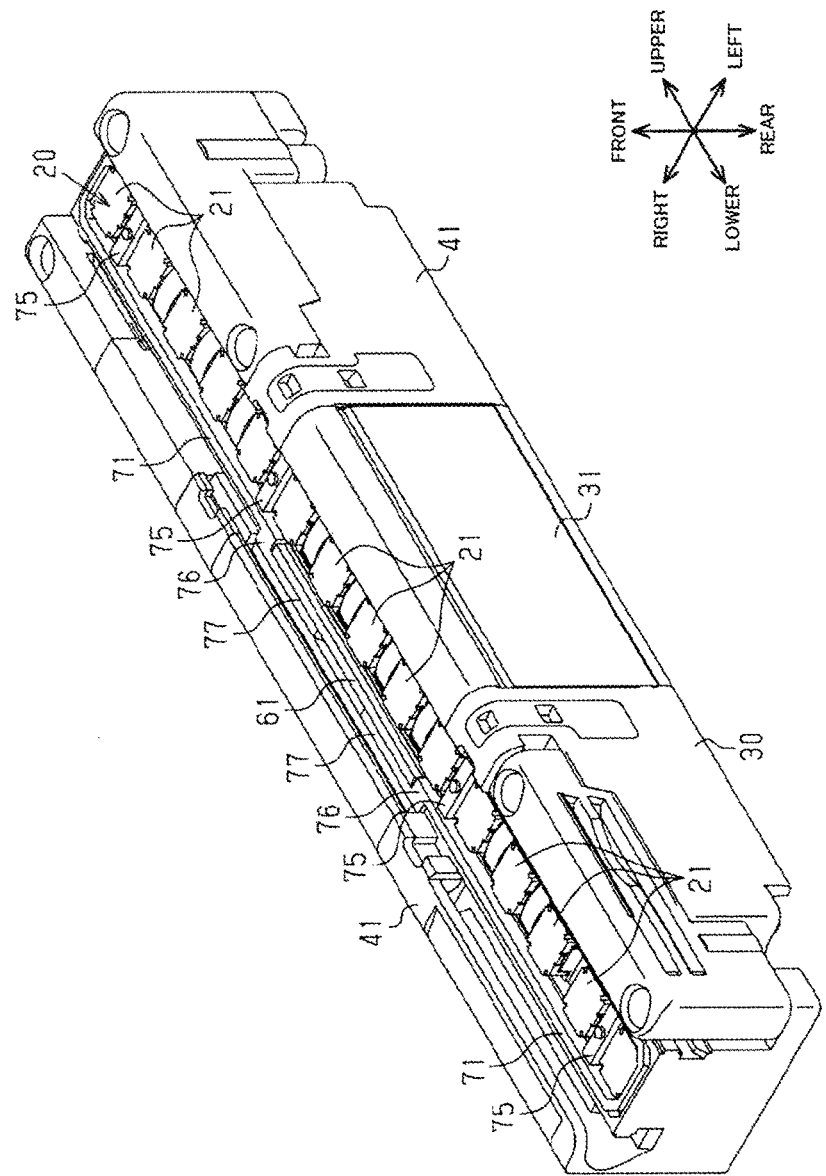
FIG. 4 is a perspective view showing a state where packings of the light receiver in the embodiment are exposed.
Figure 5:
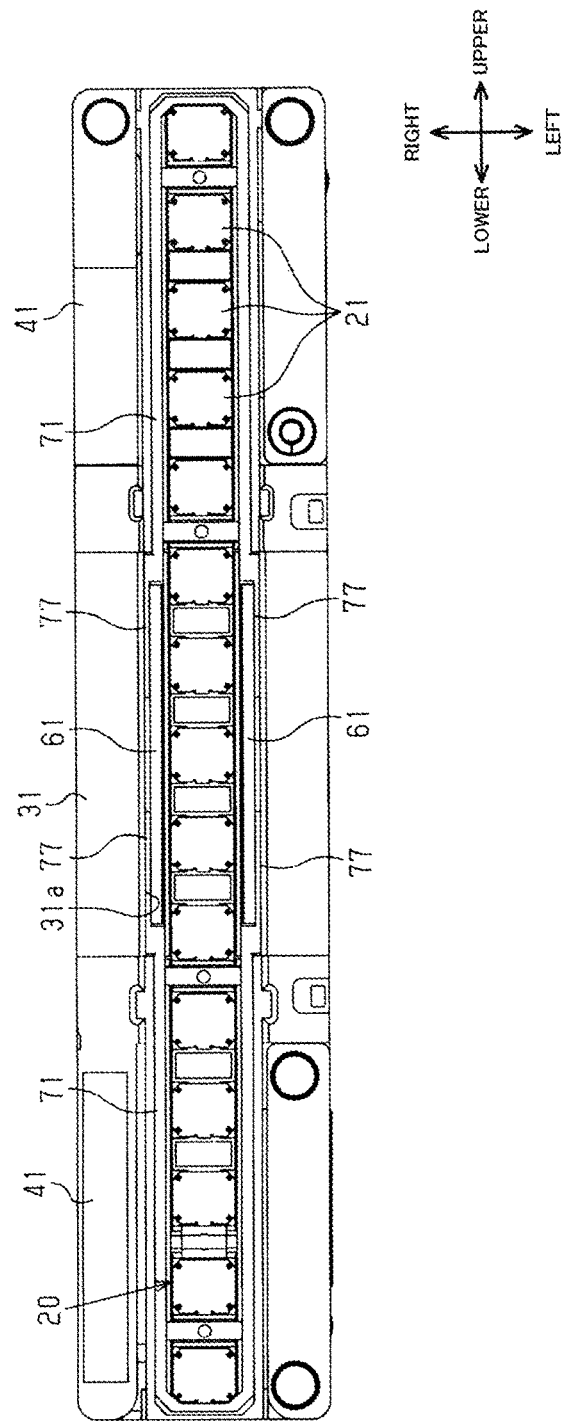
FIG. 5 is a plan view showing the state where the packings of the light receiver in the embodiment are exposed.

In the light receiver 13 of the embodiment, as shown in FIGS. 3 to 5, moreover, the gaps between the body housing 31 and the light transmissive plate 81, between the caps 41 and the light transmissive plate 81, and between the caps 41 and the body housing 31 are sealed by two kinds or total of four packings 61, 71.

<Body-Side Packings 61>

Figure 10:
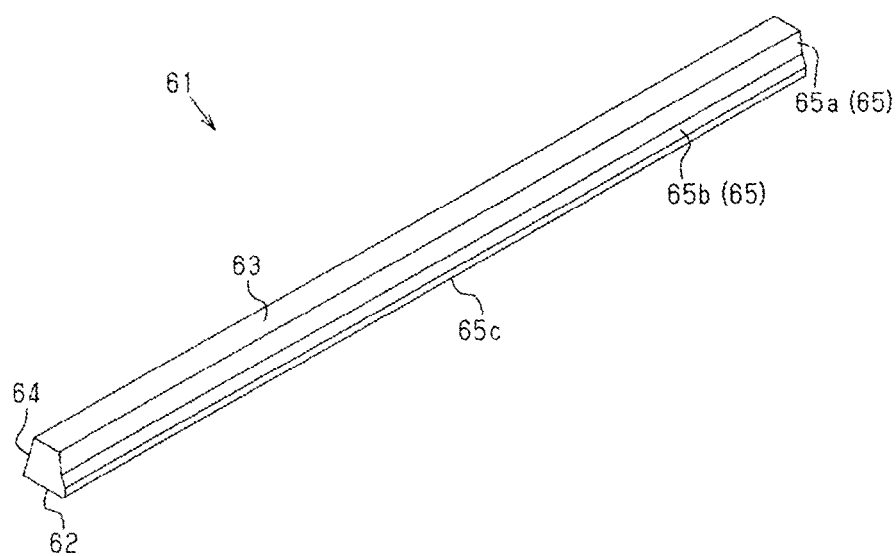
FIG. 10 is a perspective view of a body-side packing in the embodiment.
Figure 11:
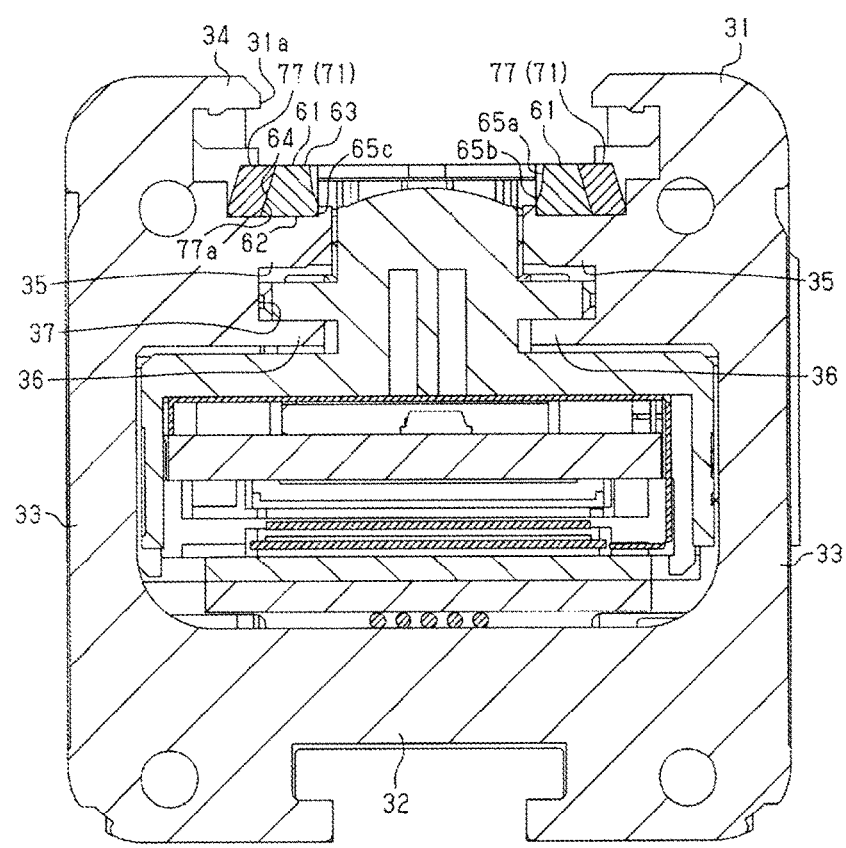
FIG. 11 is a sectional view showing the state where the packings of the light receiver in the embodiment are exposed.

As shown in FIGS. 10 and 11, the two body-side packings 61 are elongated and formed so that a section taken along a direction perpendicular to the longitudinal direction has a substantially trapezoidal shape. Each of the body-side packings 61 is placed on the side of the front surface of the corresponding second extending portion 35 of the body housing 31. At this time, the second extending portion 35 inwardly projects in the lateral direction with respect to the first extending portion 34 as described above. The packing extends from the first extending portion 34 by a degree corresponding to the width (the length in the lateral direction) of the body-side packing 61 or longer. Therefore, the placing (setting) of the body-side packing 61 is facilitated.

Each of the body-side packings 61 has: a placement surface 62 which is to be placed on the corresponding second extending portion 35; a butting surface 63 which is approximately parallel to the placement surface 62, and which is to butt against the light transmissive plate 81; and two tapered surfaces (inclined surfaces) 64, 65 which are flared from the side of the butting surface 63 in a range between the placement surface 62 and the butting surface 63, and is formed so as to have a substantially trapezoidal shape.

The placement surface 62 functioning as the second butting surface is formed so as to have a shape wider than the butting surface 63 functioning as the first butting surface.

The one tapered surface 64 is a connection surface (bonding surface) which is buttingly connected to the cap-side packing 71 that will be described later.

The other tapered surface 65 is configured by two tapered surfaces 65a, 65b which have different inclination angles with respect to the butting surface 63. The tapered surface 65a which is closer to the butting surface 63 has an inclination angle that is near the right angle with respect to the butting surface 63, and the tapered surface 65b which is closer to the placement surface 62 has an inclination angle that is near an obtuse angle with respect to the butting surface 63. Namely, the difference of the inclination angles of the tapered surface 65a and the tapered surface 65b enables the worker who performs an assembling work, to recognize that the shape is different from the shape of the tapered surface 64 which is to butt against the cap-side packing 71.

Furthermore, an inner corner portion 65c between the tapered surface 65b and the placement surface 62 is formed so as to have a curved surface. The inner corner portion 65c is configured so as to butt in the lateral direction against the projection 35a of the second extending portion 35. Here, the inner corner portion 65c of the body-side packing 61 has a curved surface as described above, and therefore easily butts against the projection 35a.

<Cap-Side Packings 71>

Figure 9:
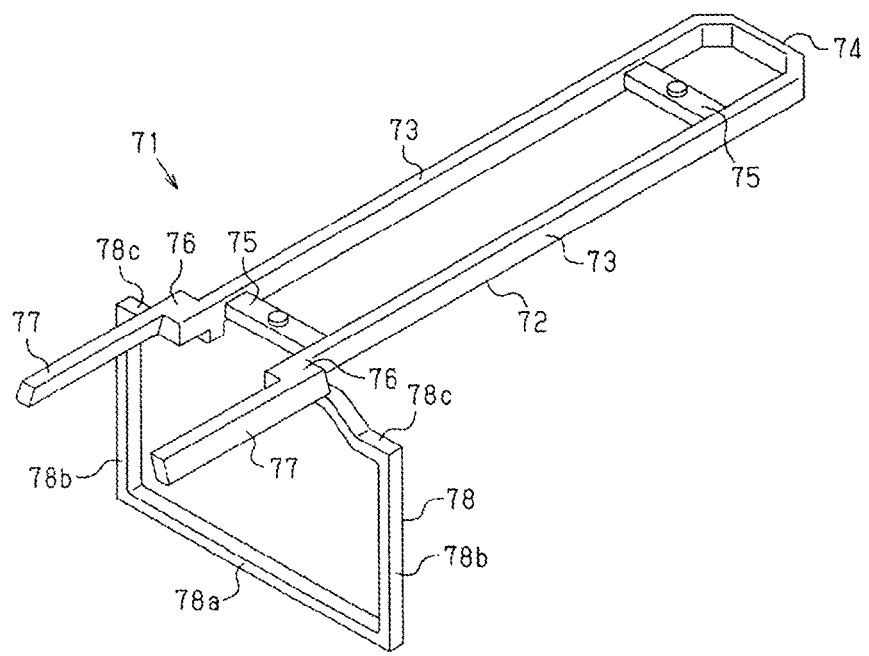
FIG. 9 is a perspective view of the cap-side packing in the embodiment.

As shown in FIG. 9, each of the two cap-side packings 71 has a first packing 72 and a second packing 78.

The first packings 72 are packings which seal mainly the gaps between the caps 41 and the light transmissive plate 81.

The first packings 72 seal between the caps 41 and the both side edges of the light transmissive plate 81, and between the caps 41 and the end portions of the light transmissive plate 81, and are connected to the pair of body-side packings 61.

Each of the first packings 72 has: a pair of side portions 73 which correspond between the both side edges of the light transmissive plate 81 and the cap 41; an end-portion continuous portion 74 which causes the side portions 73 to be continuous to each other in one end portions of the side portions 73, and which corresponds between the end portion side of the light transmissive plate 81 and the cap 41; and two beam portions 75 which connect the side portions 73 to each other at positions that are separated from the end-portion continuous portion 74.

The first packing 72 has: crank portions 76 which outwardly spread in the lateral direction with respect to the side portions 73, in the other end portions of the side portions 73; and a pair of connecting portions 77 which extend from the crank portions 76, and which are to be connected to the body-side packings 61. The first packing 72 is formed so as to have a polygonal shape (quadrangular shape) having a plurality of planes. Each of the connecting portions 77 is formed so that its section has a substantially parallelogram shape, and a tapered surface (inclined surface) 77a which is on the laterally inner side is to butt against (be press-bonded to) the tapered surface 64 of the above-described body-side packing 61.

Each of the crank portions 76 has a crank shape in which the connecting portion 77 is outwardly widened in the lateral direction with respect to the side portion 73 by a degree corresponding to the width (the length in the lateral direction) of the body-side packing 61. According to the configuration, even in the case where the side portion 73 and the body-side packing 61 are aligned in a same straight line, for example, the crank portion 76 enables the connecting portion 77 to be placed at a position where it does not extremely interfere with the body-side packing 61. Even in a state where the body-side packing 61 is placed on the second extending portion 35 of the body housing 31, namely, it is possible to suppress a situation where, when the first packing 72 (the connecting portion 77) and the body-side packing 61 are to be placed (set) so as to butt against each other, the body-side packing 61 and the connecting portion 77 extremely interfere with each other to impede the setting work.

The second packings 78 are packings which seal the gaps between the caps 41 and the body housing 31, and formed integrally with the first packings 72. The second packings 78 are formed so as to have a polygonal shape having a plurality of planes.

<Light Transmissive Plate 81>

As shown in FIG. 3, the multi-optical axis photoelectric sensor further has the light transmissive plate 81 which closes the opening 31a in the front surface of the body housing 31.

As shown in FIG. 3, the light transmissive plate 81 is formed so as to have an elongated planar shape. The light transmissive plate 81 has a middle light transmissive portion 82 which is in the longitudinal middle side, and end light transmissive portions 83 which are on the both sides of the middle light transmissive portion 82, and is disposed so as to straddle the body housing 31 and the caps 41. Furthermore, the middle light transmissive portion 82 corresponding to the body housing 31 is formed so as to be larger in width than the end light transmissive portions 83 corresponding to the caps 41.

<Pressing Members 91>

The middle light transmissive portion 82 of the light transmissive plate 81 is clamped between two pressing members 91 and the packings 61, 71 by, in a state where the portion is placed on the packings 61, inserting the pressing members 91 between the middle light transmissive portion 82 and the first extending portions 34 of the body housing 31.

Figure 12:
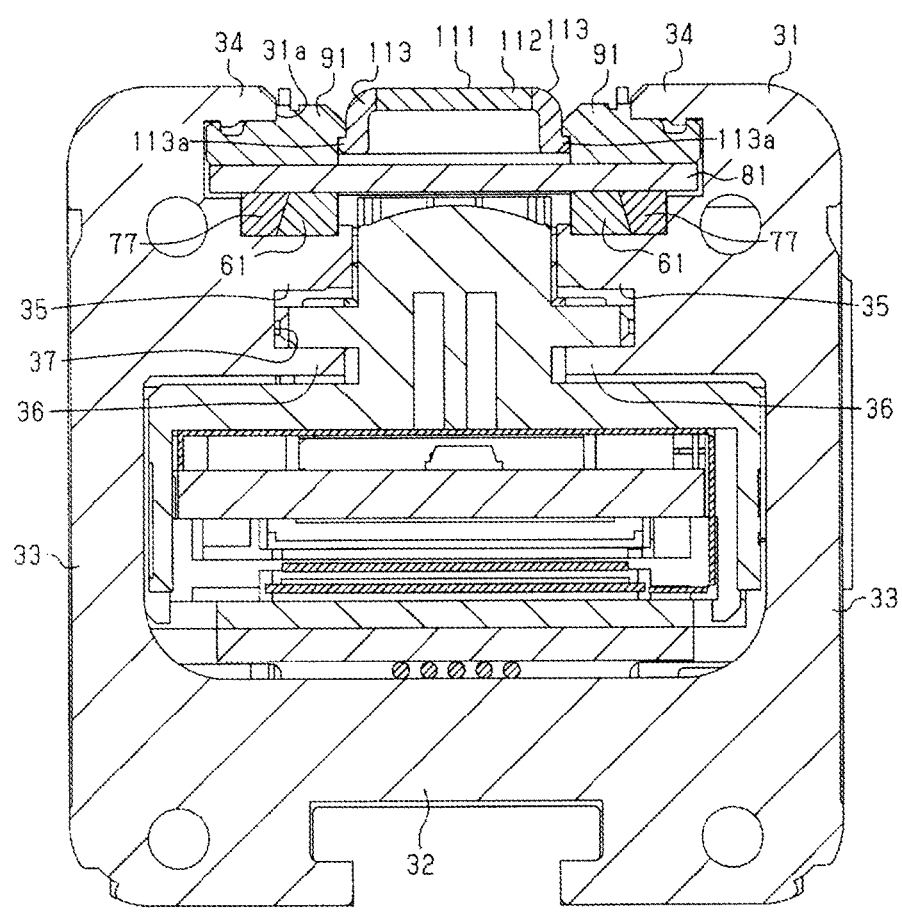
FIG. 12 is a sectional view of the light receiver in the embodiment.

At this time, the middle light transmissive portion 82 is rearwardly pressed in accordance with the insertion of the pressing members 91 as shown in FIG. 12, whereby the body-side packings 61 and the cap-side packings 71 (the connecting portions 77) are compressed and connected (press-bonded).

<Cap Covers 101>

As shown in FIG. 3, the end light transmissive portions of the light transmissive plate 81 are fixed by press-inserting cap covers 101 into the caps 41 in a state where the portions are placed on the packings 71. Specifically, the cap covers 101 are press-inserted so as to cover the projections 52 of the caps 41. According to the configuration, the end light transmissive portions 83 are clamped between the cap covers 101 and the packings 71. The cap covers 101 are configured by, for example, aluminum, and higher in rigidity than the light transmissive plate 81, and function also to protect the light transmissive plate 81.

<Protective Cover 111>

In the light receiver 13 of the embodiment, as shown in FIGS. 2 and 3, moreover, a detachable protective cover 111 is disposed on the front surface of the light transmissive plate 81.

The protective cover 111 is formed so as to have an elongated shape, and has a planar body portion 112, and elongated portions 113 which extend in a crank-like manner from the both side edges of the body portion 112. The elongated portions 113 are configured so that their tip end portions 113a extend to the both lateral sides, and the tip end portions 113a are engaged with the cap covers 101 and the pressing members 91 in the anteroposterior direction. The protective cover 111 employs the so-called snap fit fixation in which the cover is fitted and fixed to the cap covers 101 and the pressing members 91 by using own elastic deformation and elastic deformations of the cap covers 101 and the pressing members 91. According to the configuration, other fastening members and the like are not necessary, and the protective cover 111 can be easily fixed.

Next, the function of the thus configured multi-optical axis photoelectric sensor will be described. The functions of the light projector 12 and light receiver 13 which are examples of the multi-optical axis photoelectric sensor are basically common to each other, and, in the following, the function of the light receiver 13 will be therefore exemplarily described.

In the light receiver 13 of the embodiment, the gaps between the body housing 31 and the caps 41 are sealed by the second packings 78 of the cap-side packings 71. The cap-side packings 71 further seal the gaps between the caps 41 and the light transmissive plate 81. The gap between the body housing 31 and the light transmissive plate 81 is sealed by the pair (two) of body-side packings 61, and the connecting portions 77 and crank portions 76 of the cap-side packings 71.

Here, the pair of body-side packings 61 are connected (press-bonded) in the both end portions to the connecting portions 77 of the cap-side packings 71. In the embodiment, namely, the number of the connecting portions of the packings 61, 71 is four.

Next, effects of the embodiment will be described.

(1) The first packings 72 functioning as the second sealing portions, and the second packings 78 functioning as the third sealing portions are integrally molded with each other, and therefore the first packings 72 and the second packings 78 are not required to be connected to each other by adhesion or press-bonding. That is, the connecting portions in the packings are formed only between the pair of body-side packings 61 and the first packings 72. In the case where the first packings 72 (the cap-side packings 71) are connected to the both end portions of the pair of body-side packings 61, respectively, namely, the connection is made at four places, and therefore the number of connecting portions can be reduced.

(2) The light receiving elements 15 (the photoelectric elements) are housed also in the caps 41. Therefore, the above-described reduction of the connecting portions of the packings 61, 71 in the configuration where the first packings 72 seal between the caps 41 and the light transmissive plate 81 has large significance.

(3) The disposition of the beam portions 75 which connect the side portions 73 of the first packing 72 can prevent the side portions 73 from inwardly falling down.

(4) Each of the first packings 72 has the crank portions 76 which cause the connecting portions 77 to be outwardly separated with respect to the pair of side portions 73, between the side portions 73 and the connecting portions 77, and therefore the connecting portions 77 can be outwardly separated by the crank portions 76, so that the body-side packings 61 can be placed inner than the connecting portions 77. In the configuration, a work of setting the body-side packings 61 and the connecting portions 77 in the body housing 31 is easily performed. Moreover, for example, the side portions 73 of the first packing 72, and the body-side packing 61 can be placed substantially in a same straight line, and therefore it is possible to prevent the body-side packing 61 which is placed in the inner side, from being placed on the optical axes L of the light receiving elements 15 (the photoelectric elements).

(5) The body-side packings 61 and the cap-side packings 71 are formed so as to have a polygonal shape having a plurality of planes. When butting of the packings 61, 71 against the components is to be performed, therefore, the butting through the planes performed. Consequently, the contact area can be widened as compared with a point contact. As a result, the sealing property can be enhanced.

(6) Each of the body-side packings 61 is formed so that the placement surface 62 has a shape which is wider than the butting surface 63. When, in an assembling process, a force is applied to (compresses) the body-side packing 61 from the front surface side (the side of the light transmissive plate 81), therefore, the body-side packing can be stably held to the body housing 31 because the butting surface 62 has the wider shape. Also in the case where, in the compression of the body-side packing 61, a force in a twisting direction acts on the side of the butting surface 63 of the body-side packing 61, the butting surface 62 is stabilized, and therefore it is possible to prevent the body-side packing 61 from being twisted.

(7) The connecting surfaces between the body-side packing 61 and the first packing 72 (cap-side packing 71) are the tapered surfaces 64, 77a, and therefore the connection can be made while forming the connecting surfaces between the body-side packing 61 and the first packing 72 as tapered surfaces (inclined surfaces). Consequently, a gap is hardly formed between the body-side packing 61 and the first packing 72, and the waterproofing property can be enhanced. Because of the tapered surfaces 64, 77a, furthermore, the contact area can be ensured while suppressing the lengths (thicknesses) of the packings 61 and the first packings 72 in the anteroposterior direction.

The above-described embodiment can be changed in the following manners.

Although the embodiment has the configuration where, in the first packing 72 of each of the cap-side packings 71, the side portions 73 are connected to each other by the two beam portions 75, a configuration where the side portions are not connected by the beam portions 75 may be employed. Moreover, the number of the beam portions 75 may be arbitrarily changed.

Although the embodiment has the configuration where the first packing 72 of each of the cap-side packings 71 has the crank portions 76 which cause the connecting portions 77 to be outwardly separated with respect to the pair of side portions 73, a configuration where the crank portions 76 are omitted may be employed. In this case, the side portion 73 and the connecting portion 77 are aligned in a same straight line. At this time, the body-side packings 61 may be disposed so as to be located between the pair of connecting portions 77. Moreover, the body-side packings 61 may be disposed so as to be located laterally outside the pair of connecting portions 77. The connecting portions 77 and the body-side packings 61 may be disposed so as to butt against each other only in the anteroposterior direction.

Although, in the embodiment, the body-side packings 61 and the cap-side packings 71 (the first packings 72 and the second packings 78) are formed to have a substantially quadrangular shape having a plurality of planes, another polygonal shape may be employed. Moreover, a columnar shape may be employed.

Although, in the embodiment, the placement surface 62 functioning as the second butting surface is formed so as to have a shape which is wider than the butting surface 63 functioning as the first butting surface, a configuration where the placement surface 62 and the butting surface 63 have the same width, or that where the butting surface 63 has a shape which is wider than the placement surface 62 may be employed.

Although not particularly described in the embodiment, the following configuration may be employed in the second packings 78 of the cap-side packings 71.

As shown in FIG. 9, each of the second packings 78 has: a first edge portion 78a which, in a state where the packing is interposed between the cap 41 and the body housing 31, is located on the side of the rear surface (the rear plate 32) of the body housing 31; a pair of second edge portions 78b which are elongated from the both end portions of the first edge portion 78a toward the front surface of the body housing 31; and a pair of third edge portions 78c which are elongated from the second edge portions 78b in an approaching direction. A section which is taken in a direction perpendicular to the elongation direction of the first edge portion 78a, and that which is taken in a direction perpendicular to the elongation direction of the third edge portions 78c are larger in size than that which is taken in a direction perpendicular to the elongation direction of the second edge portions 78b. According to the configuration, it is possible to prevent the second edge portions 78b from inwardly falling down.

Although, in the embodiment, the number of the photoelectric elements (the light projecting elements 14 and the light receiving elements 15) disposed in each of the multi-optical axis photoelectric sensors (the light projector 12 and the light receiver 13) constituting the light curtain 11 is fifteen, the number is not limited to this.

Although, in the embodiment, the configuration where the photoelectric elements (the light projecting elements 14 or the light receiving elements 15) are disposed also in the caps is employed, a configuration where the photoelectric elements in the caps 41 are omitted may be employed.

In the embodiment, the multi-optical axis photoelectric sensor may be used in an application other than a light curtain.

The embodiment and the modifications may be adequately combined with each other.

Next, technical concepts which can be known from the embodiment and the other examples will be additionally described in the followings.

<Supplement 1> The multi-optical axis photoelectric sensor according to any one of claims 1 to 6, wherein the caps, the second sealing portions, and the third sealing portions are integrally molded by two-color molding.

When the caps, the second sealing portions, and the third sealing portions are previously molded by two-color molding, therefore, an assembling process is not additionally required, and hence the man-hours for assembly can be reduced.

<Supplement 2> The multi-optical axis photoelectric sensor according to any one of claims 1 to 6 or Supplement 1, wherein the third sealing portions are configured so as to, between the caps and the body housing, cover peripheral edges of the openings of the end portions of the body housing, and each of the third sealing portions has: a first edge portion which, in a state where the third sealing portion is interposed between the cap and the body housing, is located on the side of the rear surface of the body housing; a pair of second edge portions which are elongated from the both end portions of the first edge portion toward the front surface of the body housing; and a pair of third edge portions which are elongated from the second edge portions in an approaching direction, and a section which is taken in a direction perpendicular to an elongation direction of the first edge portion, and a section which is taken in a direction perpendicular to an elongation direction of the third edge portions are larger in size than a section which is taken in a direction perpendicular to the elongation direction of the second edge portions.

According to the configuration, it is possible to prevent the second edge portions from inwardly falling down.

<Supplement 3> The multi-optical axis photoelectric sensor according to any one of claims 1 to 6, Supplement 1, or Supplement 2, wherein the sensor further includes a positioning portion which positions the body housing and the caps.

According to the configuration, it is possible to perform positioning of the body housing and the caps.

Although the invention has been described in detail and with reference to the specific embodiment, it is obvious to a person skilled in the art that various changes and modifications can be made without departing from the spirit and scope of the invention.

The application is based on Japanese Patent Application (No. 2015-073807) filed Mar. 31, 2015, and its disclosure is incorporated herein by reference.

REFERENCE NUMERALS AND SIGNS

11 . . . light curtain, 12 . . . light projector (multi-optical axis photoelectric sensor), 13 . . . light receiver (multi-optical axis photoelectric sensor), 14 . . . light projecting element (photoelectric element), 15 . . . light receiving element (photoelectric element), 31 . . . body housing, 31a, 31b, 41a . . . opening, 41 . . . cap, 61 . . . body-side packing (first sealing portion), 64 . . . tapered surface, 71 . . . cap-side packing (second sealing portion and third sealing portion), 72 . . . first packing (second sealing portion), 73 . . . side portion, 74 . . . end-portion continuous portion, 75 . . . beam portion, 76 . . . crank portion, 77 . . . connecting portion, 77a . . . tapered surface, 78 . . . second packing (third sealing portion), 81 . . . light transmissive plate.

The invention claimed is:

1. A multi-optical axis photoelectric sensor comprising:
    a body housing having openings in a front surface and both end portions;
    a pair of caps that respectively close the openings of the both end portions of the body housing;
    a light transmissive plate that closes the opening of the front surface of the body housing, wherein through which light of photoelectric elements is transmissible through the light transmissive plate, and the light transmissive plate is disposed to straddle the body housing and the pair of caps;

a pair of first sealing portions that seal between the body housing and both side edges of the light transmissive plate;

second sealing portions that seal between the caps and the side edges of the light transmissive plate and between the caps and end portions of the light transmissive plate, wherein the second sealing portions are connected to the pair of first sealing portions; and third sealing portions which are integrally molded with the second sealing portions respectively, and which seal between the caps and the body housing.

2. The multi-optical axis photoelectric sensor according to claim 1, wherein each of the second sealing portions includes:

a pair of side portions that correspond between the both side edges of the light transmissive plate and the cap;

an end-portion continuous portion that connects the side portions to each other in one end portions of the side portions, and that corresponds between a side of the end portion of the light transmissive plate and the cap; and a beam portion that connects the side portions to each other at a position that is separated from the end-portion continuous portion.

3. The multi-optical axis photoelectric sensor according to claim 1, wherein each of the second sealing portions includes:

a pair of side portions that correspond between the both side edges of the light transmissive plate and the cap;

a pair of connecting portions connected to the pair of first sealing portions; and crank portions which are provided between the side portions and the connecting portions, and which cause the connecting portions to be outwardly separated with respect to the pair of side portions.

4. The multi-optical axis photoelectric sensor according to claim 1, wherein the first sealing portions, the second sealing portions, and the third sealing portions form a polygonal shape having a plurality of planes.

5. The multi-optical axis photoelectric sensor according to claim 4, wherein each of the first sealing portions includes:

a first butting surface that has a planer shape, and that butts against the light transmissive plate in a condition that the first sealing portion is clamped between the light transmissive plate and the body housing.

6. The multi-optical axis photoelectric sensor according to claim 1, wherein connecting surfaces between the first sealing portions and the second sealing portions are tapered surfaces.

* * * * *